US012587229B2

(12) United States Patent (10) Patent No.: US 12,587,229 B2
Chou et al. (45) Date of Patent: Mar. 24, 2026

(54) DUAL BLUETOOTH ARCHITECTURE OF SINGLE IC AND CONTROL METHOD THEREOF

(71) Applicant: REALTEK SEMICONDUCTOR CORPORATION, Hsinchu (TW)

(72) Inventors: You-Rung Chou, Hsinchu (TW); Ching-Her Huang, Hsinchu (TW); Hsin-Yu Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 466 days.

(21) Appl. No.: 18/232,844

(22) Filed: Aug. 11, 2023

(65) Prior Publication Data

US 2024/0275423 A1 Aug. 15, 2024

(30) Foreign Application Priority Data

Feb. 14, 2023 (TW) .................................. 112105235

(51) Int. Cl.
*H04B 1/401* (2015.01)
(52) U.S. Cl.
CPC .................................... *H04B 1/401* (2013.01)
(58) Field of Classification Search
CPC ......... H04B 1/401; H04B 1/0475; H04B 1/10
See application file for complete search history.

(56) References Cited

U.S. PATENT DOCUMENTS

| | | | | |
|---|---|---|---|---|
| 8,331,289 B1 * | 12/2012 | Lee | ......................... | H04B 1/006 |
| | | | | 370/328 |
| 11,329,702 B2 * | 5/2022 | Hsu | ......................... | H04W 4/80 |
| 2007/0060055 A1 * | 3/2007 | Desai | .................... | H04W 88/06 |
| | | | | 455/41.2 |
| 2017/0086097 A1 * | 3/2017 | Wasily | .................. | H04W 88/06 |

* cited by examiner

*Primary Examiner* — Nguyen T Vo
(74) *Attorney, Agent, or Firm* — WPAT, PC

(57) ABSTRACT

A method for controlling the operation of a dual Bluetooth architecture of a single IC includes: after establishing a first link of a first Bluetooth circuit, performing a first group of steps; and after establishing a second link of a second Bluetooth circuit, performing a second group of steps. The first group of steps includes: determining whether the second link uses a modulation technique; when the second link uses the modulation technique, disabling the first Bluetooth circuit from using it; and when the second link does not use the modulation technique, enabling the first Bluetooth circuit to use it. The second group of steps includes: determining whether the first link uses the modulation technique; when the first link uses the modulation technique, disabling the second Bluetooth circuit from using it; and when the first link does not use the modulation technique, enabling the second Bluetooth circuit to use it.

18 Claims, 4 Drawing Sheets

DUAL BLUETOOTH ARCHITECTURE OF SINGLE IC AND CONTROL METHOD THEREOF

BACKGROUND OF THE INVENTION

1. Field of the Invention

The present disclosure relates to a Bluetooth (BT) architecture and the control method thereof, especially to a dual BT architecture of a single IC and the control method thereof.

2. Description of Related Art

In some applications, two sets of Bluetooth (BT) circuits are set in one single integrated circuit (IC). When both of the two sets of BT circuits use an Enhanced Data Rate (EDR) technology to transmit signals, the signal of one set of BT circuits will interfere with the signal of the other set of BT circuits, and consequently signal reception qualities of the two sets of BT circuits and their connection partners will be poor.

SUMMARY OF THE INVENTION

An object of the present disclosure is to provide a dual Bluetooth (BT) architecture of a single IC and the control method thereof. The dual BT architecture and the method can prevent two sets of BT circuits of the dual BT architecture from interfering with each other.

An embodiment of the dual BT architecture of the present disclosure can prevent two sets of BT circuits of the dual BT architecture from using the same specific modulation technology simultaneously to avoid mutual interference. The dual BT architecture includes a first set of BT circuits, a second set of BT circuits, and a shared storage circuit. The first set of BT circuits includes: a first media access control (MAC) circuit; and a first hardware circuit configured to execute first firmware and thereby control the first MAC control. The second set of BT circuits includes: a second MAC circuit; and a second hardware circuit configured to execute second firmware and thereby control the second MAC control. The shared storage circuit is coupled with the first set of BT circuits and the second set of BT circuits, and is configured to store the information of the first MAC circuit and the information of the second MAC circuit. When the dual BT architecture operates, the first hardware circuit accesses the information of the second MAC circuit stored in the shared storage circuit and thereby determines whether a BT link of the second set of BT circuits is already established, and when the BT link of the second set of BT circuits is already established, the first hardware circuit determines whether the second set of BT circuits uses the specific modulation technology and accordingly disables the first set of BT circuits from using the specific modulation technology when the second set of BT circuits already uses the specific technology or enables the first set of BT circuits to use the specific modulation technology when the second set of BT circuits does not use the specific modulation technology. Similarly, when the dual BT architecture operates, the second hardware circuit accesses the information of the first MAC circuit stored in the shared storage circuit and thereby determines whether a BT link of the first set of BT circuits is already established, and when the BT link of the first set of BT circuits is already established, the second hardware circuit determines whether the first set of BT circuits uses the specific modulation technology and accordingly disables the second set of BT circuits from using the specific modulation technology when the first set of BT circuits already uses the specific technology or enables the second set of BT circuits to use the specific modulation technology when the first set of BT circuits does not use the specific modulation technology.

Another embodiment of the dual BT architecture of the present disclosure includes a first set of BT circuits, a second set of BT circuits, and a shared hardware circuit. The first set of BT circuits includes a first media access control (MAC) circuit. The second set of BT circuits includes a second MAC circuit. The shared hardware circuit is coupled with the first set of BT circuits and the second set of BT circuits, and is configured to execute shared firmware to control the first MAC circuit and the second MAC circuit. When the dual BT architecture operates, the shared hardware circuit accesses the second MAC circuit to obtain its information and thereby determines whether a BT link of the second set of BT circuits is already established; and when the BT link of the second set of BT circuits is already established, the shared hardware circuit determines whether the second set of BT circuits uses the specific modulation technology and accordingly disables the first set of BT circuits from using the specific modulation technology when the second set of BT circuits already uses the specific technology or enables the first set of BT circuits to use the specific modulation technology when the second set of BT circuits does not use the specific modulation technology. Similarly, when the dual BT architecture operates, the shared hardware circuit accesses the first MAC circuit to obtain its information and thereby determines whether a BT link of the first set of BT circuits is already established; and when the BT link of the first set of BT circuits is already established, the second hardware circuit determines whether the first set of BT circuits uses the specific modulation technology and accordingly disables the second set of BT circuits from using the specific modulation technology when the first set of BT circuits already uses the specific technology or enables the second set of BT circuits to use the specific modulation technology when the first set of BT circuits does not use the specific modulation technology.

An embodiment of the method of the present disclosure for controlling the operation of a dual BT architecture of a single IC can prevent a first set of BT circuits and a second set of BT circuits of the dual BT architecture from using the same specific modulation technology simultaneously to avoid mutual interference. The method includes the following steps: after establishing a first link of the first set of BT circuits, performing a first group of steps; and after establishing a second link of the second set of BT circuits, performing a second group of steps. The first group of steps includes: determining whether the second link of the second set of BT circuits is already established; when the second link is not established, enabling the first set of BT circuits to use the specific modulation technology; and when the second link is already established, determining whether the second link uses the specific modulation technology. Based on the result of the above determination, the first group of steps further includes: when the second link uses the specific modulation technology, disabling the first set of BT circuits from using the specific modulation technology; and when the second link does not use the specific modulation technology, enabling the first set of BT circuits to use the specific modulation technology. The second group of steps includes: determining whether the first link of the first set of BT circuits is already established; when the first link is not established, enabling the second set of BT circuits to use the specific modulation technology; and when the first link is already established, determining whether the first link uses the specific modulation technology. Based on the result of the above determination, the second group of steps further includes: when the first link uses the specific modulation technology, disabling the second set of BT circuits from using the specific modulation technology; and when the first link does not use the specific modulation technology, enabling the second set of BT circuits to use the specific modulation technology.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a dual Bluetooth (BT) architecture of a single integrated circuit (IC) and the control method thereof. The architecture and the method can prevent two sets of BT circuits from using the same specific modulation technology at the same time and thereby prevent the mutual interference between the two sets of BT circuits.

Figure 1:
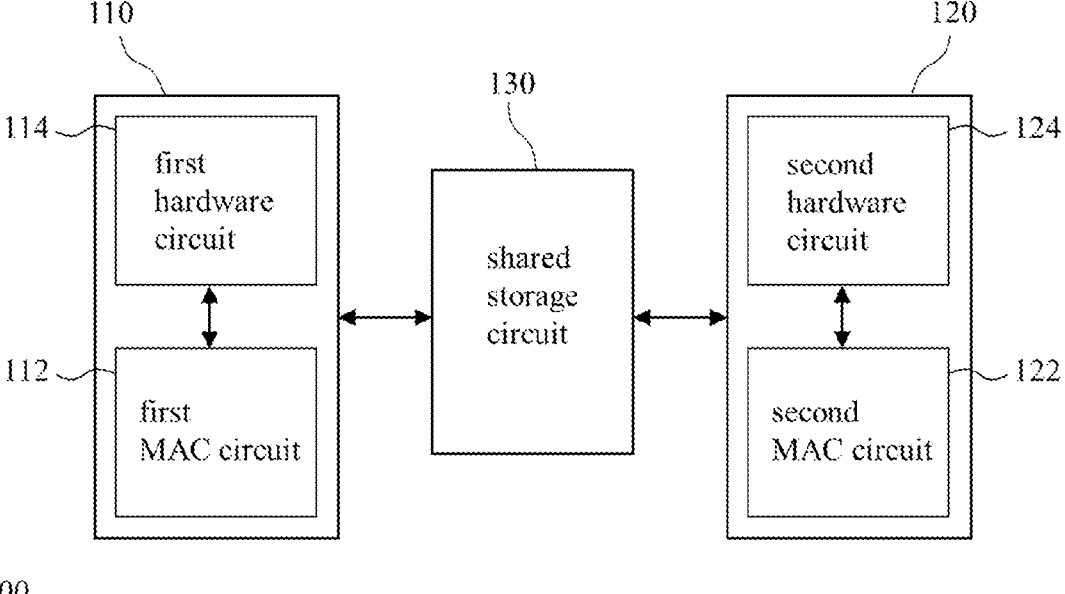
FIG. 1 shows an embodiment of the dual BT architecture of the present disclosure.

FIG. 1 shows an embodiment of the dual BT architecture of a single IC of the present disclosure. This embodiment can prevent two sets of BT circuits of the dual BT architecture from using the same specific modulation technology simultaneously to avoid mutual interference. The dual BT architecture 100 of FIG. 1 includes a first set of BT circuits 110, a second set of BT circuits 120, and a shared storage circuit 130. These circuits are described in detail in the following paragraphs. It is noted that the dual BT architecture 100 includes other known/self-developed circuits (e.g., circuits of a general BT architecture's physical layer and/or circuits of the general BT architecture's higher layer) (not shown in FIG. 1) and these circuits fall beyond the scope of the present disclosure because the present disclosure focuses on the circuits used for preventing the mutual interference.

Referring to FIG. 1, the first set of BT circuits 110 includes a first media access control (MAC) circuit 112 and a first hardware circuit 114. The first MAC circuit 112 alone is a known/self-developed MAC circuit and its detail falls beyond the scope of the present disclosure. The first hardware circuit 114 is configured to execute first firmware and thereby controls the first MAC circuit 112. The first hardware circuit 114 can be a general-purpose signal processing circuit, an Application-Specific Integrated Circuit (ASIC), and a Programmable Logic Device (PLD), but the implementation of the first hardware circuit 140 is not limited to the above examples. The content of the first firmware can be written/edited according to the present disclosure to realize the functions of the embodiment of FIG. 1. Similarly, the second set of BT circuits 120 includes a second MAC circuit 122 and a second hardware circuit 124. The second MAC circuit 122 alone is a known/self-developed MAC circuit. The second hardware circuit 124 is configured to execute second firmware and thereby controls the second MAC circuit 122. It is noted that the first firmware and the second firmware can be substantially identical or different.

Referring to FIG. 1, the shared storage circuit 130 (e.g., a shared memory and/or a shared register) is coupled with the first set of BT circuits 110 and the second set of BT circuits 120. The shared storage circuit 130 is configured to actively access the first MAC circuit 112 and the second MAC circuit 122 to obtain their information, or is configured to passively receive the information of the first MAC circuit 112 and the information of the second MAC circuit 122 and then store these information. For example, the first hardware circuit 114 executes the first firmware to obtain and store the information of the first MAC circuit 112 in the shared storage circuit 130, and the second hardware circuit 124 executes the second firmware to obtain and store the information of the second MAC circuit 122 in the shared storage circuit 130. When the dual BT architecture 100 operates:

(1) the first hardware circuit 114 executes the first firmware to obtain the information of the second MAC circuit 122 stored in the shared storage circuit 130 and thereby determines whether a BT link of the second set of BT circuits 120 is already established, and then:

(1-1) when the BT link of the second set of BT circuits 120 is not established, the first hardware circuit 114 executes the first firmware to enable the first set of BT circuits 110 to use the specific modulation technology; and (1-2) when the BT link of the second set of BT circuits 120 is already established, the first hardware circuit 114 executes the first firmware to determine whether the second set of BT circuits 120 uses the specific modulation technology and accordingly disables the first set of BT circuits 110 from using the specific modulation technology when the second set of BT 120 circuits already uses the specific technology or enables the first set of BT circuits 110 to use the specific modulation technology when the second set of BT circuits 120 does not use the specific modulation technology.

(2) the second hardware circuit 124 executes the second firmware to obtain the information of the first MAC circuit 112 stored in the shared storage circuit 130 and thereby determines whether a BT link of the first set of BT circuits 110 is already established, and then:

(2-1) when the BT link of the first set of BT circuits 110 is not established, the second hardware circuit 124 executes the second firmware to enable the second set of BT circuits 120 to use the specific modulation technology; and (2-2) when the BT link of the first set of BT circuits 110 is already established, the second hardware circuit 124 executes the second firmware to determine whether the first set of BT circuits 110 uses the specific modulation technology and accordingly disables the second set of BT circuits 120 from using the specific modulation technology when the first set of BT 110 circuits already uses the specific technology or enables the second set of BT circuits 120 to use the specific modulation technology when the first set of BT circuits 110 does not use the specific modulation technology.

Based on the above description, in an exemplary implementation the specific modulation technology is a known/self-developed Bluetooth Enhanced Data Rate (EDR) technology. In an exemplary implementation the EDR technology uses a time-varying amplitude technique. In an exemplary implementation when one of the first set of BT circuits 110 and the second set of BT circuits 120 uses the time-varying amplitude technique to generate a signal having a time-varying amplitude, the other one of the first set of BT circuits 110 and the second set of BT circuits 120 generates a signal having a constant amplitude. In an exemplary implementation: the first hardware circuit 114 periodically/nonperiodically accesses the information of the second MAC circuit 122 stored in the shared storage circuit 130 to determine whether to disable the first set of BT circuits 110 from using the specific modulation technology or enable the first set of BT circuits 110 to use the specific modulation technology; and/or the second hardware circuit 124 periodically/nonperiodically accesses the information of the first MAC circuit 112 stored in the shared storage circuit 130 to determine whether to disable the second set of BT circuits 120 from using the specific modulation technology or enable the second set of BT circuits 120 to use the specific modulation technology. In an exemplary implementation the shared storage circuit 130 is exclusively for realizing the information sharing between the first set of BT circuits 110 and the second set of BT circuits 120.

Figure 2:
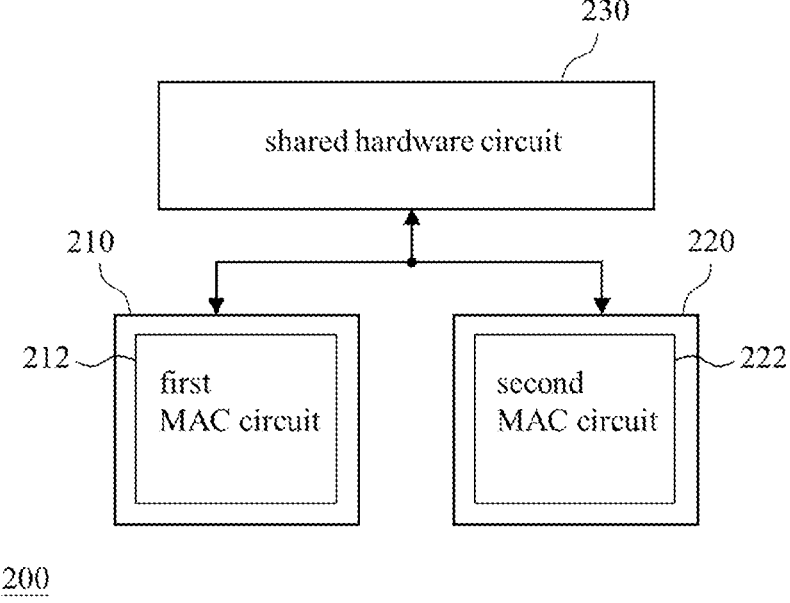
FIG. 2 shows another embodiment of the dual BT architecture of the present disclosure.

FIG. 2 shows another embodiment of the dual BT architecture of a single IC of the present disclosure. This embodiment can prevent two sets of BT circuits of the dual BT architecture from using the same specific modulation technology at the same time to avoid mutual interference. The dual BT architecture 200 of FIG. 2 includes a first set of BT circuits 210, a second set of BT circuits 220, and a shared hardware circuit 230. These circuits are described in detail in the following paragraphs. It is noted that the dual BT architecture 200 includes other known/self-developed circuits (e.g., circuits of a general BT architecture's physical layer and/or circuits of the general BT architecture's higher layer) (not shown in FIG. 2) and these circuits fall beyond the scope of the present disclosure because the present disclosure focuses on the circuits used for preventing the mutual interference.

Referring to FIG. 2, the first set of BT circuits 210 includes a first MAC circuit 212. The first MAC circuit 212 alone is a known/self-developed MAC circuit and its detail falls beyond the scope of the present disclosure. The second set of BT circuits 220 includes a second MAC circuit 222. The second MAC circuit 222 alone is a known/self-developed MAC circuit and its detail falls beyond the scope of the present disclosure.

Referring to FIG. 2, the shared hardware circuit 230 is coupled with the first set of BT circuits 210 and the second set of BT circuits 220, and is configured to execute shared firmware to control the first MAC circuit 212 and the second MAC circuit 222. When the dual BT architecture 200 operates:

(1) the shared hardware circuit 230 executes the shared firmware to obtain the information of the second MAC circuit 222 and thereby determines whether a BT link of the second set of BT circuits 220 is already established, and then:

(1-1) when the BT link of the second set of BT circuits 220 is not established, the shared hardware circuit 230 executes the shared firmware to enable the first set of BT circuits 210 to use the specific modulation technology; and (1-2) when the BT link of the second set of BT circuits 220 is already established, the shared hardware circuit 230 executes the shared firmware to determine whether the second set of BT circuits 220 uses the specific modulation technology and accordingly disables the first set of BT circuits 210 from using the specific modulation technology when the second set of BT 220 circuits already uses the specific technology or enables the first set of BT circuits 210 to use the specific modulation technology when the second set of BT circuits 220 does not use the specific modulation technology.

(2) the shared hardware circuit 230 executes the shared firmware to obtain the information of the first MAC circuit 212 and thereby determines whether a BT link of the first set of BT circuits 210 is already established, and then:

(2-1) when the BT link of the first set of BT circuits 210 is not established, the shared hardware circuit 230 executes the shared firmware to enable the second set of BT circuits 220 to use the specific modulation technology; and (2-2) when the BT link of the first set of BT circuits 210 is already established, the shared hardware circuit 230 executes the shared firmware to determine whether the first set of BT circuits 210 uses the specific modulation technology and accordingly disables the second set of BT circuits 220 from using the specific modulation technology when the first set of BT 210 circuits already uses the specific technology or enables the second set of BT circuits 220 to use the specific modulation technology when the first set of BT circuits 210 does not use the specific modulation technology.

Based on the above description, in an exemplary implementation: the shared hardware circuit 230 periodically/nonperiodically accesses the information of the second MAC circuit 222 to determine whether to disable the first set of BT circuits 210 from using the specific modulation technology or enable the first set of BT circuits 210 to use the specific modulation technology; and/or the shared hardware circuit 230 periodically/nonperiodically accesses the information of the first MAC circuit 212 to determine whether to disable the second set of BT circuits 220 from using the specific modulation technology or enable the second set of BT circuits 220 to use the specific modulation technology.

Since those having ordinary skill in the art can refer to the embodiment of FIG. 1 to appreciate the details and the modifications of the embodiment of FIG. 2, repeated and redundant description is omitted here.

Figure 3A:
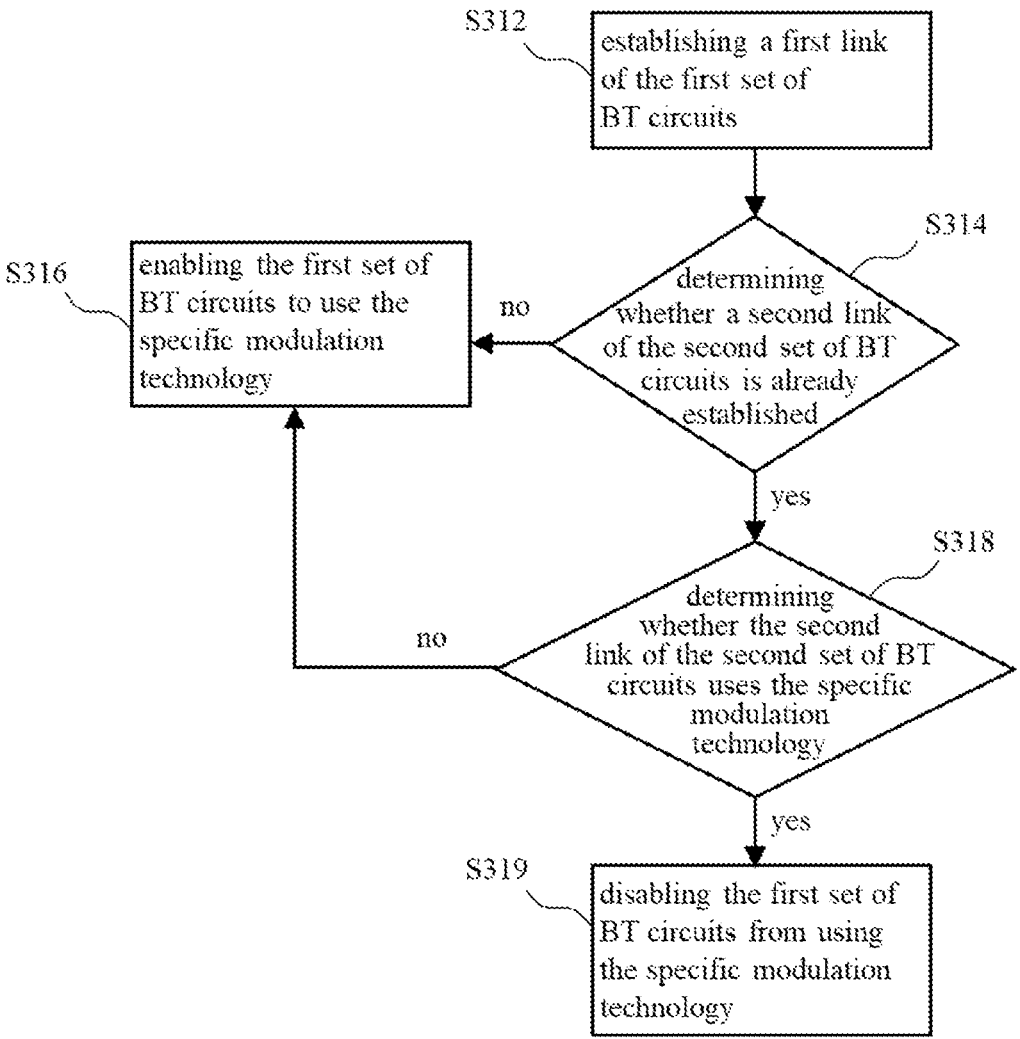
FIG. 3a shows a first process of an embodiment of the method of the present disclosure for controlling the operation of a dual BT architecture.
Figure 3B:
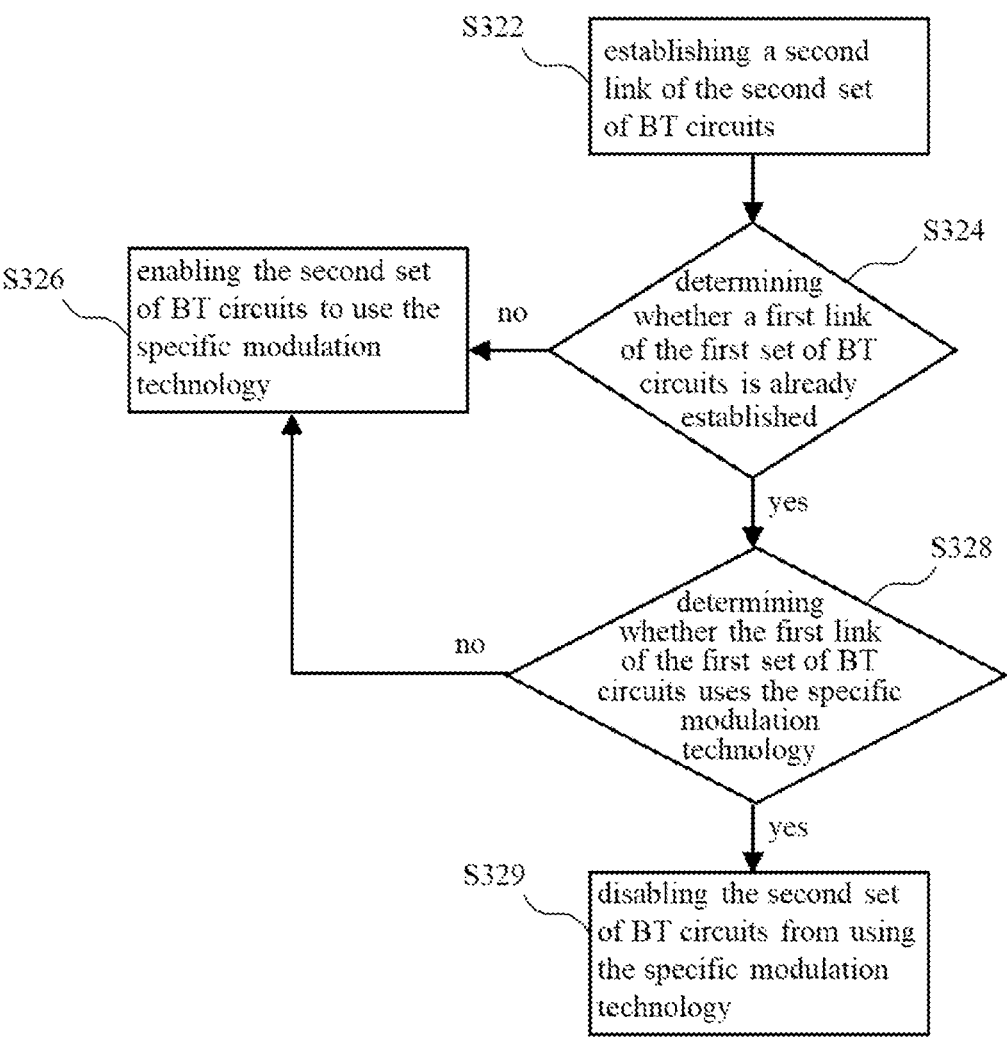
FIG. 3b shows a second process of an embodiment of the method of the present disclosure for controlling the operation of a dual BT architecture.

FIGS. 3a~3b shows an embodiment of the method of the present disclosure for controlling the operation of a dual BT architecture of a single IC. This embodiment can prevent a first set of BT circuits of the dual BT architecture and a second set of BT circuits of the dual BT architecture from using the same specific modulation technology at the same time to avoid mutual interference. The embodiment includes a first process (i.e., the process as shown in FIG. 3a) and a second process (i.e., the process as shown in FIG. 3b). The two processes are described in detail in the following paragraphs.

As shown in FIG. 3a, the first process is for controlling the first set of BT circuits and includes the following steps:

S312: establishing a first link of the first set of BT circuits.

S314: determining whether a second link of the second set of BT circuits is already established; if not, going to step S316; if so, going to step S318.

S316: enabling the first set of BT circuits to use the specific modulation technology.

S318: determining whether the second link of the second set of BT circuits uses the specific modulation technology; if not, going to step S316; if so, going to S319.

S319: disabling the first set of BT circuits from using the specific modulation technology.

As shown in FIG. 3b, the second process is for controlling the second set of BT circuits and includes the following steps:

S322: establishing a second link of the second set of BT circuits.

S324: determining whether a first link of the first set of BT circuits is already established; if not, going to step S326; if so, going to step S328.

S326: enabling the second set of BT circuits to use the specific modulation technology.

S328: determining whether the first link of the first set of BT circuits uses the specific modulation technology; if not, going to step S326; if so, going to S329.

S329: disabling the second set of BT circuits from using the specific modulation technology.

Since those having ordinary skill in the art can refer to the embodiments of FIGS. 1~2 to appreciate the details and the modifications of the embodiment of FIGS. 3a~3b, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the present invention can prevent two sets of BT circuits of a single IC from using the same specific modulation technology at the same time and thereby prevent the mutual interference between the two sets of BT circuits.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A dual Bluetooth (BT) architecture of a single IC, the dual BT architecture being used for preventing two sets of BT circuits of the dual BT architecture from using a specific modulation technology simultaneously to avoid mutual interference, and the dual BT architecture comprising:
    a first set of BT circuits, the first set of BT circuits including:
    a first media access control (MAC) circuit; and
    a first hardware circuit configured to execute first firmware and thereby control the first MAC circuit;
    a second set of BT circuits, the second set of BT circuits including:
    a second MAC circuit; and
    a second hardware circuit configured to execute second firmware and thereby control the second MAC circuit; and
    a shared storage circuit coupled with the first set of BT circuits and the second set of BT circuits, and configured to store information of the first MAC circuit and information of the second MAC circuit, wherein:

the first hardware circuit accesses the information of the second MAC circuit stored in the shared storage circuit and thereby determines whether a BT link of the second set of BT circuits is already established, and when the BT link of the second set of BT circuits is already established, the first hardware circuit determines whether the second set of BT circuits uses the specific modulation technology and accordingly disables the first set of BT circuits from using the specific modulation technology when the second set of BT circuits already uses the specific technology or enables the first set of BT circuits to use the specific modulation technology when the second set of BT circuits does not use the specific modulation technology; and the second hardware circuit accesses the information of the first MAC circuit stored in the shared storage circuit and thereby determines whether a BT link of the first set of BT circuits is already established, and when the BT link of the first set of BT circuits is already established, the second hardware circuit determines whether the first set of BT circuits uses the specific modulation technology and accordingly disables the second set of BT circuits from using the specific modulation technology when the first set of BT circuits already uses the specific technology or enables the second set of BT circuits to use the specific modulation technology when the first set of BT circuits does not use the specific modulation technology.

2. The dual BT architecture of claim 1, wherein the specific modulation technology is an Enhanced Data Rate (EDR) technology.

3. The dual BT architecture of claim 2, wherein the EDR technology uses a time-varying amplitude technique.

4. The dual BT architecture of claim 3, wherein when one of the first set of BT circuits and the second set of BT circuits uses the time-varying amplitude technique to generate a signal having a time-varying amplitude, the other one of the first set of BT circuits and the second set of BT circuits generates a signal having a constant amplitude.

5. The dual BT architecture of claim 1, wherein when the BT link of the second set of BT circuits is not established, the first hardware circuit enables the first set of BT circuits to use the specific modulation technology; and when the BT link of the first set of BT circuits is not established, the second hardware circuit enables the second set of BT circuits to use the specific modulation technology.

6. The dual BT architecture of claim 1, wherein the first hardware circuit periodically accesses the information of the second MAC circuit stored in the shared storage circuit and thereby determines whether to disable the first set of BT circuits from using the specific modulation technology or enable the first set of BT circuits to use the specific modulation technology; and/or the second hardware circuit periodically accesses the information of the first MAC circuit stored in the shared storage circuit and thereby determines whether to disable the second set of BT circuits from using the specific modulation technology or enable the second set of BT circuits to use the specific modulation technology.

7. The dual BT architecture of claim 1, wherein the shared storage circuit includes at least one of the following: a shared memory; and a shared register.

8. The dual BT architecture of claim 1, wherein the shared storage circuit is exclusively for realizing information sharing between the first set of BT circuits and the second set of BT circuits.

9. A dual Bluetooth (BT) architecture of a single IC, the dual BT architecture being used for preventing two sets of BT circuits from using a specific modulation technology simultaneously to avoid mutual interference, and the dual BT architecture comprising:

a first set of BT circuits, the first set of BT circuits including:

a first media access control (MAC) circuit;

a second set of BT circuits, the second set of BT circuits including:

a second MAC circuit; and a shared hardware circuit coupled with the first set of BT circuits and the second set of BT circuits, and configured to execute shared firmware to control the first MAC circuit and the second MAC circuit, wherein:

the shared hardware circuit accesses the second MAC circuit and thereby determines whether a BT link of the second set of BT circuits is already established, and when the BT link of the second set of BT circuits is already established, the shared hardware circuit determines whether the second set of BT circuits uses the specific modulation technology and accordingly disables the first set of BT circuits from using the specific modulation technology when the second set of BT circuits already uses the specific technology or enables the first set of BT circuits to use the specific modulation technology when the second set of BT circuits does not use the specific modulation technology; and the shared hardware circuit accesses the first MAC circuit and thereby determines whether a BT link of the first set of BT circuits is already established, and when the BT link of the first set of BT circuits is already established, the second hardware circuit determines whether the first set of BT circuits uses the specific modulation technology and accordingly disables the second set of BT circuits from using the specific modulation technology when the first set of BT circuits already uses the specific technology or enables the second set of BT circuits to use the specific modulation technology when the first set of BT circuits does not use the specific modulation technology.

10. The dual BT architecture of claim 9, wherein the specific modulation technology is an Enhanced Data Rate (EDR) technology.

11. The dual BT architecture of claim 10, wherein the EDR technology uses a time-varying amplitude technique.

12. The dual BT architecture of claim 11, wherein when one of the first set of BT circuits and the second set of BT circuits uses the time-varying amplitude technique to generate a signal having a time-varying amplitude, the other one of the first set of BT circuits and the second set of BT circuits generates a signal having a constant amplitude.

13. The dual BT architecture of claim 9, wherein when the BT link of the second set of BT circuits is not established, the shared hardware circuit enables the first set of BT circuits to use the specific modulation technology; and when the BT link of the first set of BT circuits is not established, the shared hardware circuit enables the second set of BT circuits to use the specific modulation technology.

14. The dual BT architecture of claim 9, wherein the shared hardware circuit periodically accesses the second MAC circuit and thereby determines whether to disable the first set of BT circuits from using the specific modulation technology or enable the first set of BT circuits to use the specific modulation technology; and/or the shared hardware circuit periodically accesses the first MAC circuit and thereby determines whether to disable the second set of BT circuits from using the specific modulation technology or enable the second set of BT circuits to use the specific modulation technology.

15. A method for controlling an operation of a dual Bluetooth (BT) architecture of a single IC, the method being used for preventing a first set of BT circuits and a second set of BT circuits of the dual BT architecture from using a specific modulation technology simultaneously to avoid mutual interference, the method comprising:

after establishing a first link of the first set of BT circuits:

determining whether a second link of the second set of BT circuits is already established;

when the second link is not established, enabling the first set of BT circuits to use the specific modulation technology; and when the second link is already established: determining whether the second link uses the specific modulation technology; when the second link uses the specific modulation technology, disabling the first set of BT circuits from using the specific modulation technology; and when the second link does not use the specific modulation technology, enabling the first set of BT circuits to use the specific modulation technology; and after establishing the second link of the second set of BT circuits:

determining whether the first link of the first set of BT circuits is already established;

when the first link is not established, enabling the second set of BT circuits to use the specific modulation technology; and when the first link is already established: determining whether the first link uses the specific modulation technology; when the first link uses the specific modulation technology, disabling the second set of BT circuits from using the specific modulation technology; and when the first link does not use the specific modulation technology, enabling the second set of BT circuits to use the specific modulation technology.

16. The method of claim 15, wherein the specific modulation technology is an Enhanced Data Rate (EDR) technology.

17. The method of claim 16, wherein the EDR technology uses a time-varying amplitude technique.

18. The method of claim 17, further comprising: when one of the first set of BT circuits and the second set of BT circuits uses the time-varying amplitude technique to generate a signal having a time-varying amplitude, using the other one of the first set of BT circuits and the second set of BT circuits to generate a signal having a constant amplitude.

* * * * *